United States Patent
Ahn (10) Patent No.: US 11,637,335 B2
(45) Date of Patent: Apr. 25, 2023

(54) BATTERY MODULE

(71) Applicant: LG Energy Solution, Ltd., Seoul (KR)

(72) Inventor: Moon Youl Ahn, Daejeon (KR)

(73) Assignee: LG Energy Solution, Ltd.

(*) Notice: Subject to any disclaimer, the term of this patent is extended or adjusted under 35 U.S.C. 154(b) by 0 days.

(21) Appl. No.: 17/573,158

(22) Filed: Jan. 11, 2022

(65) Prior Publication Data

US 2022/0131207 A1 Apr. 28, 2022

Related U.S. Application Data (63) Continuation of application No. 16/760,990, filed as application No. PCT/KR2019/008118 on Jul. 3, 2019, now Pat. No. 11,258,116.

(30) Foreign Application Priority Data

Jul. 3, 2018 (KR) .................. 10-2018-0077325

(51) Int. Cl.
*H01M 10/613* (2014.01)
*H01M 10/6554* (2014.01)
(Continued)

(52) U.S. Cl.
CPC ..... *H01M 10/613* (2015.04); *H01M 10/6554* (2015.04); *H01M 10/6561* (2015.04);
(Continued)

(58) Field of Classification Search
CPC ............ H01M 10/613; H01M 10/617; H01M 10/647; H01M 10/653; H01M 10/655;
(Continued)

(56) References Cited

U.S. PATENT DOCUMENTS 7,858,229 B2 12/2010 Shin et al.
9,509,023 B2 11/2016 Katayama et al.
(Continued)

FOREIGN PATENT DOCUMENTS

CN 102315501 A 1/2012
CN 205016642 U 2/2016
(Continued)

OTHER PUBLICATIONS

International Search Report for Application No. PCT/KR2019/008118 dated Oct. 11, 2019.
(Continued)

*Primary Examiner* — Lingwen R Zeng
(74) *Attorney, Agent, or Firm* — Lerner, David, Littenberg, Krumholz & Mentlik, LLP (57) ABSTRACT

A battery module includes a plurality of battery cells stacked on each other; a housing accommodating the plurality of battery cells and comprising a support member configured to support the plurality of battery cells and a cover member configured to cover the plurality of battery cells supported by the support member; and a heat sink configured to contact the support member. The support member may have a plurality of through-holes formed therein, and the plurality of through-holes may be filled with a thermal interface material.

17 Claims, 10 Drawing Sheets

(51) Int. Cl.
  *H01M 10/6561* (2014.01)
  *H01M 10/6568* (2014.01)
  *H01M 50/293* (2021.01)
  *H01M 50/211* (2021.01)
  *H01M 10/6551* (2014.01)
  *H01M 10/653* (2014.01)
  *H01M 10/647* (2014.01)
  *H01M 10/617* (2014.01)
  *H01M 10/655* (2014.01)

(52) U.S. Cl.
  CPC ..... *H01M 10/6568* (2015.04); *H01M 50/211* (2021.01); *H01M 50/293* (2021.01); *H01M 10/617* (2015.04); *H01M 10/647* (2015.04); *H01M 10/653* (2015.04); *H01M 10/655* (2015.04); *H01M 10/6551* (2015.04); *Y02E 60/10* (2013.01)

(58) Field of Classification Search
  CPC ......... H01M 10/6551; H01M 10/6554; H01M 10/6561; H01M 10/6568; H01M 50/20; H01M 50/211; H01M 50/293; Y02E 60/10
  See application file for complete search history.

(56) References Cited

U.S. PATENT DOCUMENTS

| | | |
|---|---|---|
| 10,153,526 B2 | 12/2018 | Motohashi et al. |
| 2010/0136420 A1 | 6/2010 | Shin et al. |
| 2012/0009455 A1 | 1/2012 | Yoon |
| 2012/0115003 A1 | 5/2012 | Park et al. |
| 2014/0234668 A1 | 8/2014 | Sweney et al. |
| 2014/0234683 A1 | 8/2014 | Sweney |
| 2014/0234686 A1 | 8/2014 | Sweney et al. |
| 2015/0044538 A1 | 2/2015 | Katayama et al. |
| 2016/0141735 A1 | 5/2016 | Motohashi et al. |
| 2018/0090800 A1 | 3/2018 | Lim et al. |
| 2018/0175468 A1 | 6/2018 | Shin et al. |
| 2018/0366794 A1 | 12/2018 | Kim et al. |
| 2019/0013556 A1 | 1/2019 | Sakaguchi et al. |
| 2019/0334218 A1 | 10/2019 | Choi et al. |

FOREIGN PATENT DOCUMENTS

| | | |
|---|---|---|
| CN | 206076435 U | 4/2017 |
| CN | 206520349 U | 6/2017 |
| CN | 206322821 U | 7/2017 |
| CN | 10771366 A | 3/2018 |
| CN | 107871913 A | 4/2018 |
| EP | 2405528 A1 | 1/2012 |
| JP | 2012018915 A | 1/2012 |
| JP | 5259602 B2 | 8/2013 |
| JP | 2014216113 A | 11/2014 |
| JP | 5862681 B2 | 2/2016 |
| JP | 2016514345 A | 5/2016 |
| JP | 6130916 B2 | 5/2017 |
| KR | 20110130277 A | 12/2011 |
| KR | 20160026029 A | 3/2016 |
| KR | 20170027075 A | 3/2017 |
| KR | 20170107798 A * | 9/2017 |
| KR | 20170107798 A | 9/2017 |
| KR | 20180005456 A | 1/2018 |
| KR | 20180007436 A | 1/2018 |
| WO | 2011149234 A2 | 12/2011 |
| WO | 2017159528 A1 | 9/2017 |
| WO | 2018008866 A1 | 1/2018 |
| WO | 2018012721 A1 | 1/2018 |
| WO | 2018080010 A1 | 5/2018 |

OTHER PUBLICATIONS

Extended European Search Report including Written Opinion for Application No. 19831022.9 dated Feb. 11, 2021, pp. 1-9.
Search Report dated Feb. 8, 2023 from the Office Action for Chinese Application No. 201980013077.3 dated Feb. 10, 2023, 4 pages. [See p. 2-3, categorizing the cited references].

* cited by examiner

BATTERY MODULE

CROSS-REFERENCE TO RELATED APPLICATIONS

This application is a continuation of U.S. patent application Ser. No. 16/760,990, filed on May 1, 2020, which is a national phase entry under U.S.C. § 371 of International Application No. PCT/KR2019/008118, filed on Jul. 3, 2019, which claims priority from Korean Patent Application No. 10-2018-0077325, filed on Jul. 3, 2018, the disclosures of which are incorporated herein by reference in their entirety.

TECHNICAL FIELD

The present invention relates to a battery module.

BACKGROUND ART

In recent years, with an increase in the demand for portable electronic devices, such as laptop computers, smartphones, and tablet computers, research has been actively conducted on high-performance secondary batteries that are capable of being repeatedly charged and discharged.

In addition, secondary batteries have come to be widely used in middle- or large-sized devices, such as vehicles, robots, and satellites, as well as small-sized devices, such as portable electronic devices. In particular, as fossil fuels are being depleted and increasing attention is being paid to environmental pollution, research on hybrid vehicles and electric vehicles is being actively conducted. The most essential part of a hybrid vehicle or an electric vehicle is a battery pack configured to supply electric power to a motor.

The hybrid vehicle or the electric vehicle has an advantage in that fuel economy is high and no pollutants are discharged or the amount of pollutants that are discharged is reduced compared to a vehicle using only an internal combustion engine, since it is possible to obtain drive force from the battery pack. The battery pack used in the hybrid vehicle or the electric vehicle includes a battery module, which includes a plurality of battery cells. The plurality of battery cells are connected to each other in series and/or in parallel, whereby the capacity and output of the battery module are increased.

Since a plurality of battery cells are closely arranged in the inner space of the battery pack, it is particularly important to smoothly discharge the heat generated from the plurality of battery cells to the outside. If the heat generated by the electrochemical reaction in the battery cell is not smoothly discharged to the outside, heat may accumulate in the battery module, resulting in deterioration, ignition or explosion of the battery module.

DISCLOSURE

Technical Problem

The present invention has been made in view of the above problems, and it is an object of the present invention to provide a battery module capable of smoothly discharging heat generated in a battery cell to the outside.

Technical Solution

In accordance with an embodiment of the present invention, the above and other objects can be accomplished by the provision of a battery module including a plurality of battery cells that are stacked on each other; a housing accommodating the plurality of battery cells and comprising a support member configured to support the plurality of battery cells and a cover member configured to cover the plurality of battery cells supported by the support member; and a heat sink configured to contact the support member, wherein the support member may have a plurality of through-holes formed therein, and the plurality of through-holes may be filled with a thermal interface material.

A region where the plurality of battery cells are disposed may be divided into a plurality of temperature regions based on a temperature distribution of the plurality of battery cells, and a distance between the plurality of through-holes formed in the support member may be set differently according to the plurality of temperature regions.

The plurality of temperature regions may comprise a high temperature region, a low temperature region, and a middle region between the high temperature region and the low temperature region, and a distance between the plurality of through-holes at a portion of the support member corresponding to the middle region may gradually increase in a direction from the high temperature region toward the low temperature region.

A thermal interface material may be interposed between the plurality of battery cells and the support member so as to be connected to the thermal interface material in the plurality of through-holes of the support member.

The battery module according to an embodiment of the present invention may further comprise a heat dissipation pad disposed between the plurality of battery cells and the support member, wherein the heat dissipation pad may have a plurality of through-holes formed therein, and the plurality of through-holes of the heat dissipation pad may be filled with a thermal interface material.

The plurality of through-holes of the heat dissipation pad may be formed at positions corresponding to the plurality of through-holes of the support member, and the thermal interface material in the plurality of through-holes of the heat dissipation pad and the thermal interface material in the plurality of through-holes of the support member may be connected to each other.

A region where the plurality of battery cells are disposed may be divided into a plurality of temperature regions based on a temperature distribution of the plurality of battery cells, and a distance between the plurality of through-holes formed in the heat dissipation pad may be set differently according to the plurality of temperature regions.

The plurality of temperature regions may comprise a high temperature region, a low temperature region, and a middle region between the high temperature region and the low temperature region, and a distance between the plurality of through-holes at a portion of the heat dissipation pad corresponding to the middle region may gradually increase in a direction from the high temperature region toward the low temperature region.

A thermal interface material may be interposed between the plurality of battery cells and the heat dissipation pad so as to be connected to the thermal interface material in the plurality of through-holes of the heat dissipation pad.

BEST MODE

Hereinafter, a battery module according to an embodiment of the present invention will be described with reference to the accompanying drawings.

Figure 1:
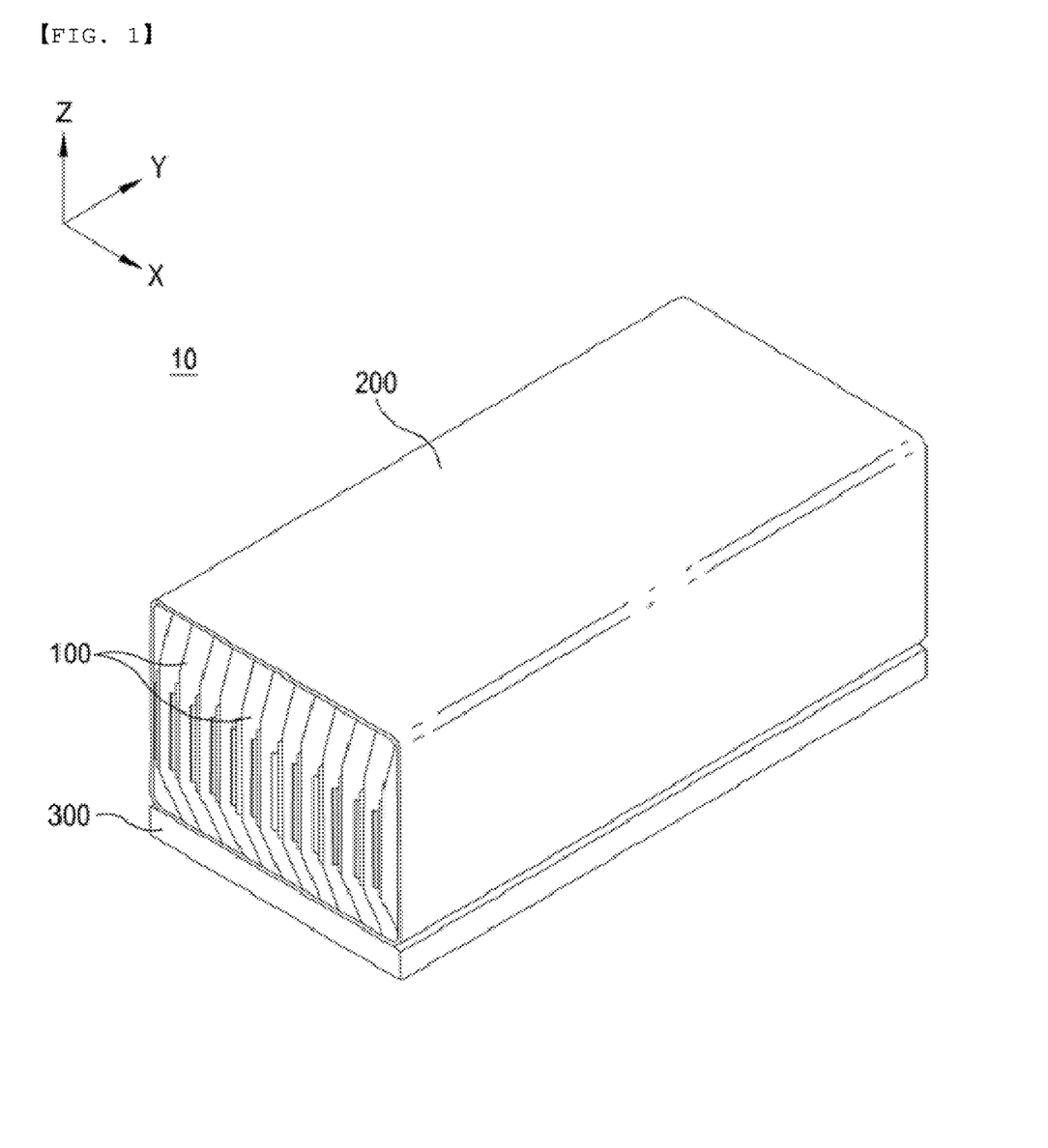
FIG. 1 is a perspective view schematically showing a battery module according to a first embodiment of the present invention.

As shown in FIG. 1, a battery module 10 according to a first embodiment of the present invention includes a plurality of battery cells 100 stacked on each other, a housing 200 accommodating the battery cells 100, and a heat sink 300 connected to the housing 200.

The plurality of battery cells 100 are disposed to face each other. The plurality of battery cells 100 may be electrically connected to each other. Hereinafter, the length direction of the battery cell 100 will be defined as a Y-axis direction, the width direction of the battery cell 100 will be defined as a Z-axis direction, and the thickness direction of the battery cell 100 will be defined as an X-axis direction. Here, the plurality of battery cells 100 are stacked in the X-axis direction.

Figure 2:
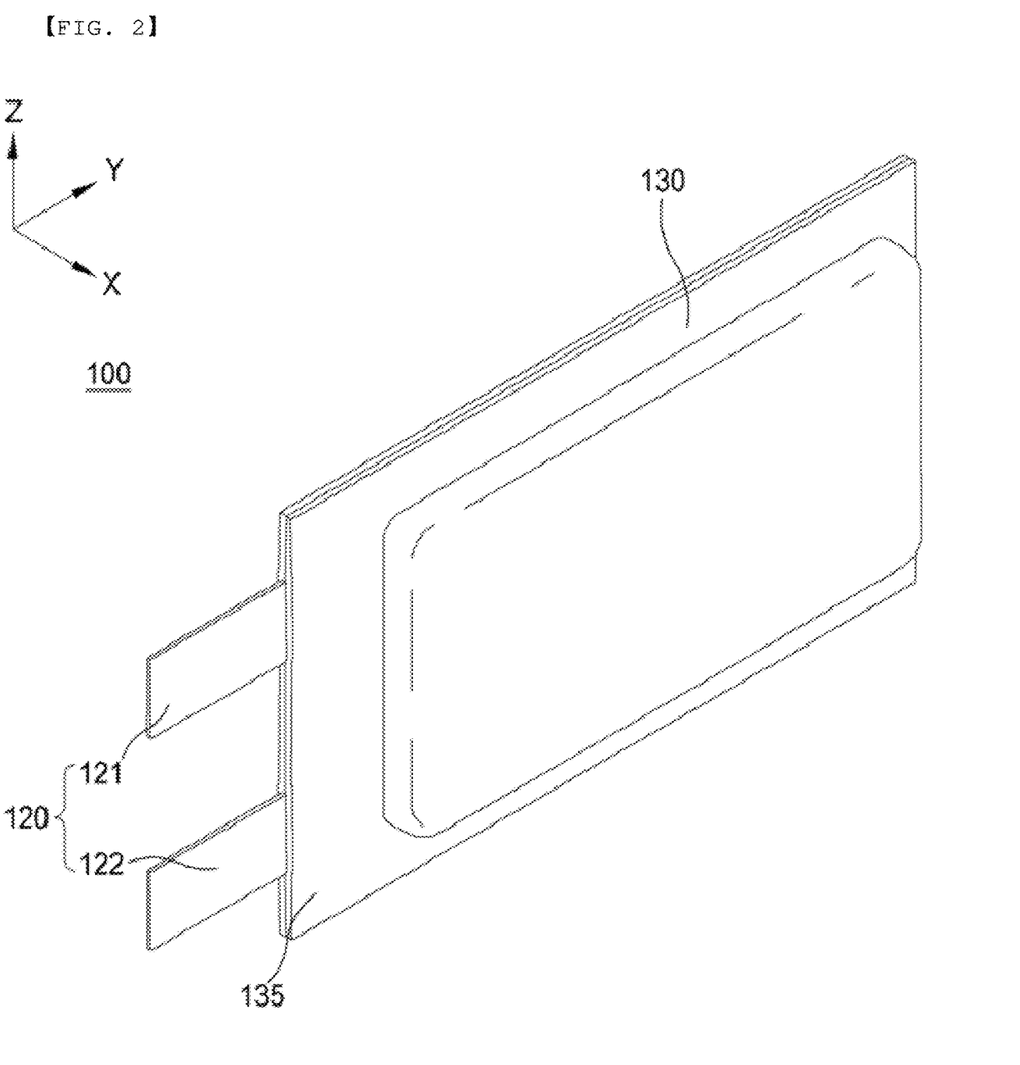
FIG. 2 is a perspective view schematically showing a battery cell of the battery module according to the first embodiment of the present invention.
Figure 3:
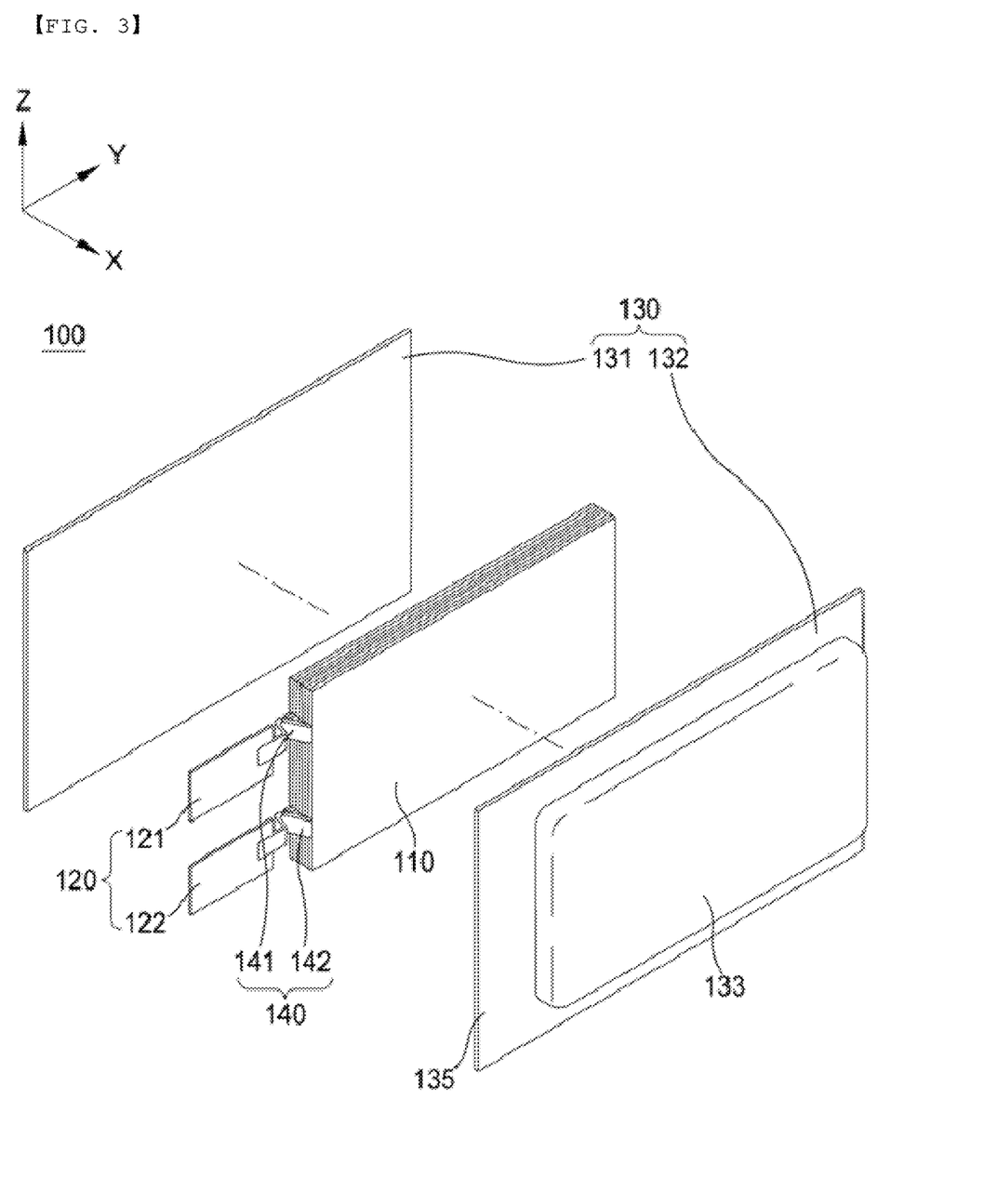
FIG. 3 is an exploded perspective view schematically showing the battery cell of the battery module according to the first embodiment of the present invention.

As shown in FIGS. 2 and 3, each of the battery cells 100 includes an electrode assembly 110, electrode leads 120, and a pouch 130.

The electrode assembly 110 includes a plurality of electrode plates and a plurality of separators interposed between the plurality of electrode plates. The plurality of electrode plates include one or more positive electrode plates and one or more negative electrode plates. Each of the electrode plates of the electrode assembly 110 is provided with an electrode tab 140. The electrode tab 140 is configured so as to protrude outwards from a corresponding one of the electrode plates.

The end (the connection part) of each of the electrode leads 120 is connected to the electrode assembly 110 via the electrode tabs 140, and the end of the electrode lead 120 that is opposite the connection part of the electrode lead, which is connected to the electrode assembly 110, is exposed out of the pouch 130. The electrode leads 120 serve as electrode terminals of the battery module 10. The electrode leads 121 and 122 are electrically connected to the electrode assembly 110 through the electrode tabs 140. The electrode leads 121 and 122 are welded to connection parts of the electrode tabs 140, whereby the electrode leads are connected to the electrode tabs 140.

Each of the plurality of electrode plates, i.e. the positive electrode plates and the negative electrode plates, is provided with the electrode tabs 140. The electrode tabs 140 include positive electrode tabs 141, which are connected to the positive electrode lead 121, and negative electrode tabs 142, which are connected to the negative electrode lead 122. A plurality of positive electrode tabs 141 is connected to a single positive electrode lead 121, and a plurality of negative electrode tabs 142 is connected to a single negative electrode lead 122.

The pouch 130 has therein a reception space, configured to receive the electrode assembly 110, and an electrolytic solution. The pouch 130 includes a first pouch member 131 and a second pouch member 132. A concave reception recess 133 is formed in one of the first pouch member 131 and the second pouch member 132.

The first pouch member 131 and the second pouch member 132 are coupled to each other in order to form the reception space. The edges of the first pouch member 131 and the second pouch member 132 are sealed together by thermal bonding, etc., whereby the reception space is hermetically sealed. The pouch 130 has an extension part 135, which extends from the part of the pouch in which the reception space is formed, and the electrode leads 120 are withdrawn outwards from the extension part 135.

Figure 4:
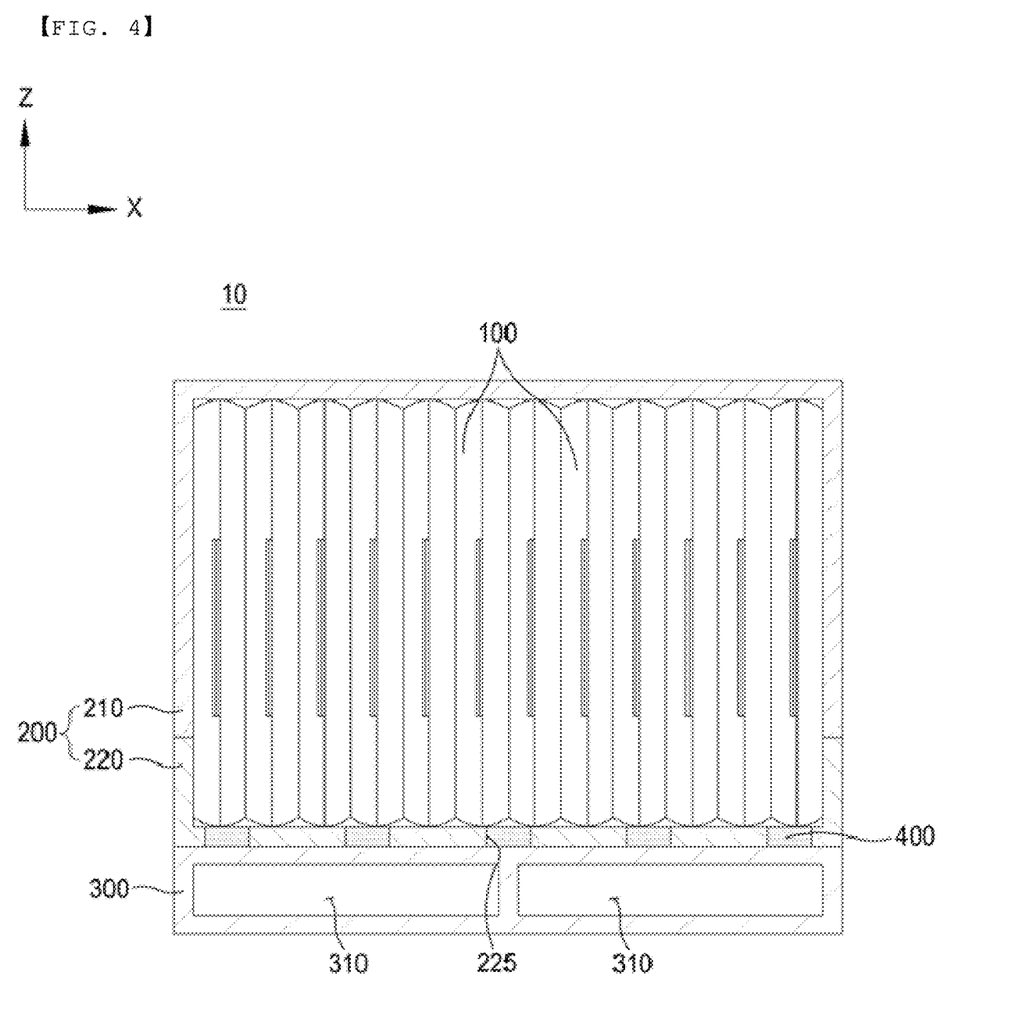
FIG. 4 is a sectional view schematically showing the battery module according to the first embodiment of the present invention.
Figure 5:
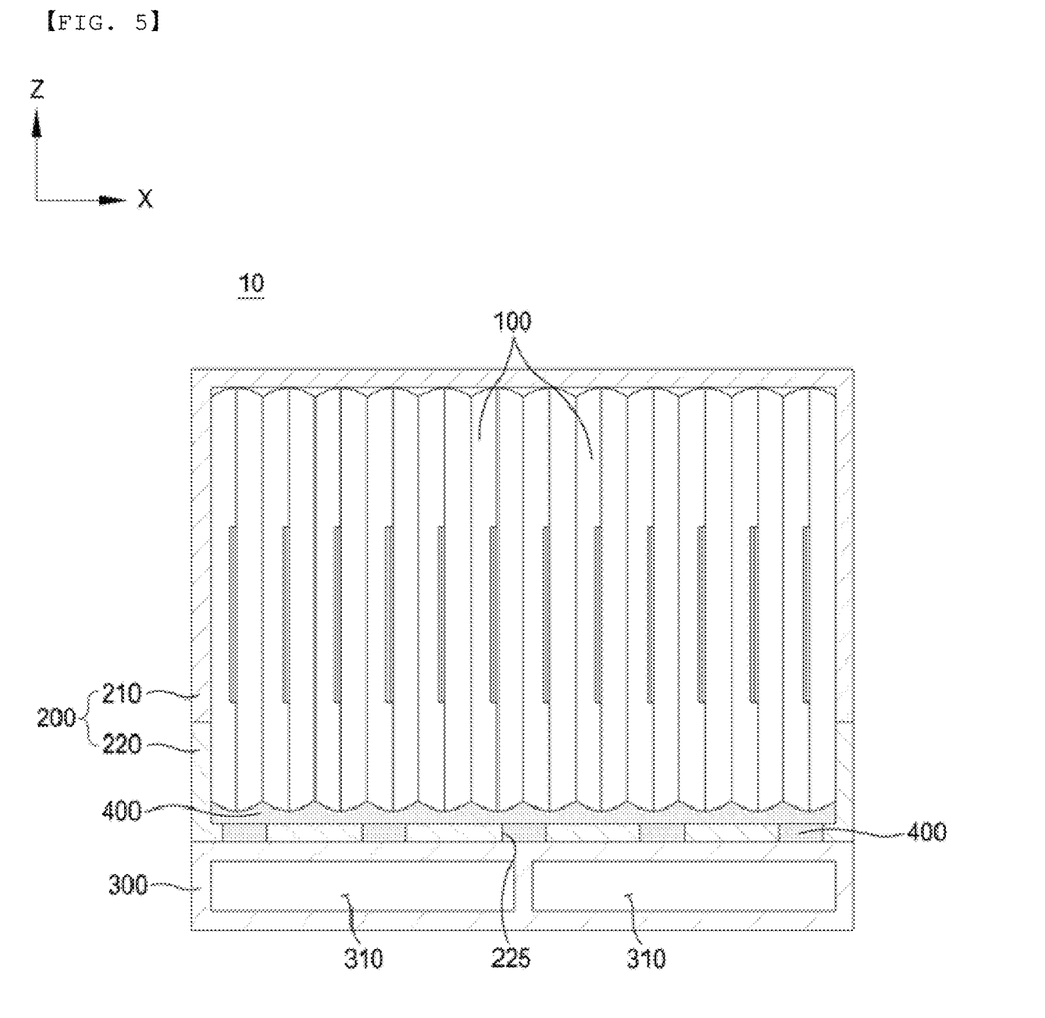
FIG. 5 is a sectional view schematically showing another example of the battery module according to the first embodiment of the present invention.

As shown in FIGS. 4 and 5, a housing 200 accommodates the plurality of battery cells 100. The housing 200 includes a cover member 210 and a support member 220. The cover member 210 and the support member 220 are coupled to each other in order to form a space to accommodate the plurality of battery cells 100 in the housing 200. The support member 220 serves to support the plurality of battery cells 100. In addition, the support member 220 serves to transfer heat generated from the plurality of battery cells 100 to the heat sink 300 by contacting the heat sink 300. The cover member 210 serves to cover the plurality of battery cells 100 supported by the support member 220 so as to protect the plurality of battery cells 100 from the outside.

As shown in FIG. 4, the plurality of battery cells 100 may be in direct contact with the support member 220. In this case, heat generated in the plurality of battery cells 100 may be directly transferred to the support member 220, and then transferred to the heat sink 300.

In another example, as shown in FIG. 5, a thermal interface material (TIM) 400 may be interposed between the plurality of battery cells 100 and the support member 220. The thermal interface material 400 may have adhesive properties. In this case, the plurality of battery cells 100 may be attached to the support member 220 through the thermal interface material 400 having adhesive properties. In addition, a state in which the plurality of battery cells 100 are stacked may be maintained by the thermal interface material 400. As the thermal interface material 400, at least one of a heat dissipating grease, a thermally conductive adhesive, and a phase change material may be used. In this case, the heat generated in the plurality of battery cells 100 may be transferred to the support member 220 through the thermal interface material 400, and then transferred to the heat sink 300. Since the thermal interface material 400 may be in close contact with the surfaces of the plurality of battery cells 100 as the thermal interface material 400 is made of a resin material, the thermal interface material 400 may smoothly absorb heat generated from the plurality of battery cells 100 and transfer the heat to the support member 220.

The support member 220 may be made of a metal material to guarantee rigidity and smooth heat transfer. For example, it is preferable that the support member 220 is made of aluminum to guarantee rigidity and smooth heat transfer as well as lightness.

Figure 6:
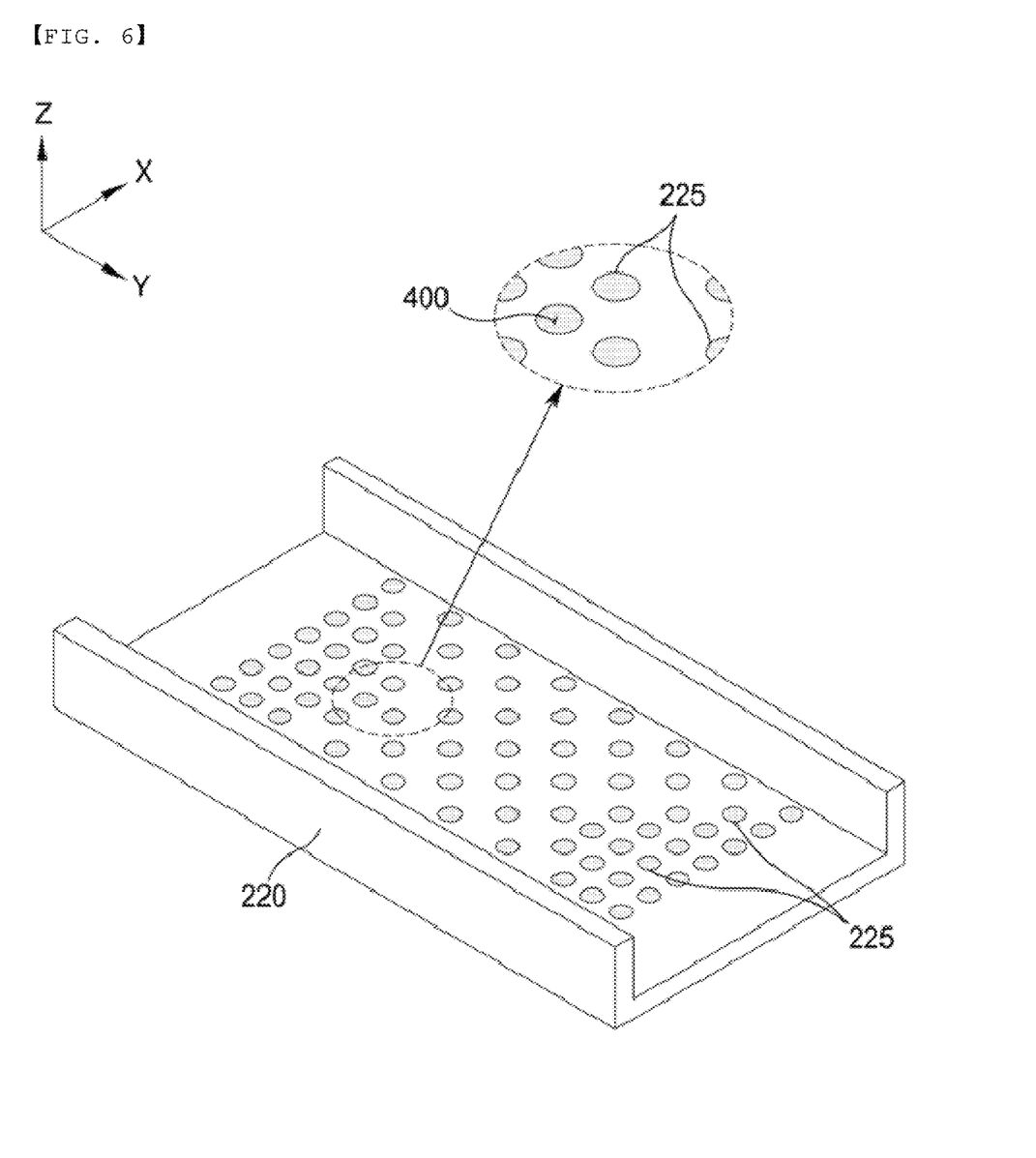
FIG. 6 is a perspective view schematically showing a support member of the battery module according to the first embodiment of the present invention.

As shown in FIG. 6, a plurality of through-holes 225 may be formed in the support member 220. Each of the plurality of through-holes 225 may have various shapes such as a circular shape and a polygonal shape. The plurality of through-holes 225 may serve to reduce the contact resistance between the plurality of battery cells 100 and the support member 220.

The inside of the plurality of through-holes 225 may be filled with the thermal interface material 400. The thermal interface material 400 may contact the plurality of battery cells 100 and the heat sink 300 through the through-holes 225. Accordingly, the heat generated in the plurality of battery cells 100 may be transferred to the heat sink 300 through the thermal interface material 400.

As such, the plurality of through-holes 225 are formed in the support member 220 and the plurality of through-holes 225 are filled with the thermal interface material 400. Therefore, the heat generated in the plurality of battery cells 100 may be smoothly discharged to the outside through the thermal interface material 400 in the support member 220 and the through-holes 225.

Therefore, as shown in FIG. 4, even in the case in which the thermal interface material 400 is not interposed between the plurality of battery cells 100 and the support member 220, the heat generated in the plurality of battery cells 100 may be smoothly discharged to the outside through the thermal interface material 400 in the support member 220 and through-holes 225.

Meanwhile, as shown in FIG. 5, the thermal interface material 400 may be provided between the plurality of battery cells 100 and the support member 220 so as to be connected to the thermal interface material 400 in the plurality of through-holes 225 of the support member 220. In this case, since the heat transfer efficiency increases as the plurality of through-holes 225 of the support member 220 are filled with the thermal interface material 400, the amount of thermal interface material 400 interposed between the plurality of battery cells 100 and the support member 220 may be reduced. Therefore, as the amount of the thermal interface material 400 is reduced, the weight of the battery module 10 may be reduced, and the cost required for using the thermal interface material 400 may be reduced.

Meanwhile, the plurality of through-holes 225 formed in the support member 220 may be disposed at a predetermined distance from each other. However, in consideration of the temperature distribution in the region where the plurality of battery cells 100 are disposed, it is preferable that the plurality of through-holes 225 are distributed in an appropriate pattern.

Figure 7:
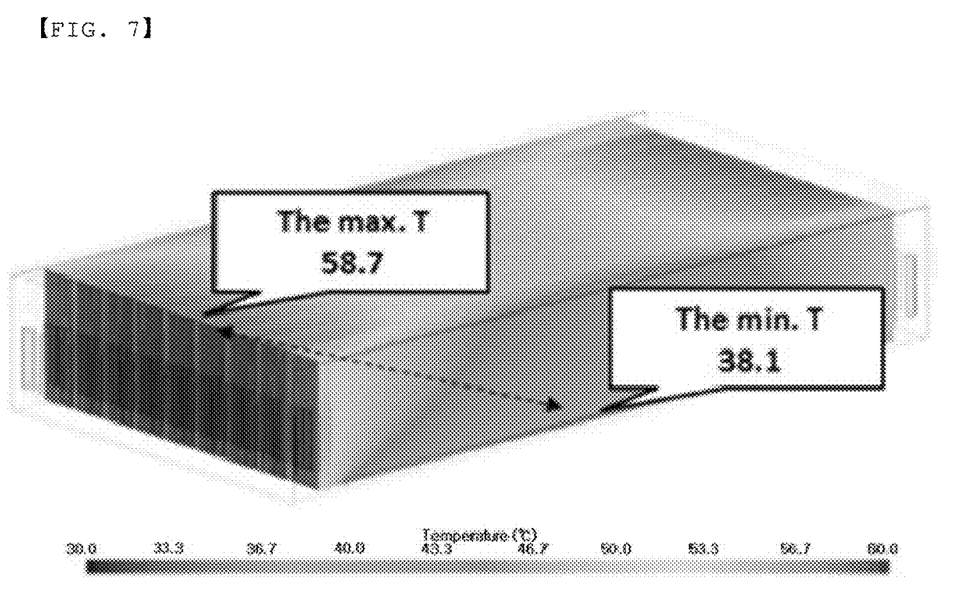
FIG. 7 is a view schematically showing a temperature distribution in a region where a plurality of battery cells are arranged in the first embodiment of the present invention.

As shown in FIG. 7, the temperature of the plurality of battery cells 100 in the battery module 10 is not uniform as a whole, and there are a high temperature region in which the temperature is relatively high, a low temperature region in which the temperature is relatively low, and a middle region having a temperature gradient (a temperature gradually changing) between the high temperature region and the low temperature region.

Therefore, in the portion of the support member 220 corresponding to the high temperature region in order that the heat can be smoothly discharged to the outside, it is preferable to arrange the plurality of through-holes 225 at a smaller distance (i.e., a larger number of the through-holes 225 are arranged densely) compared to the remaining portions. In the portion of the support member 220 corresponding to the low temperature region, it is preferable to arrange the plurality of through-holes 225 at a larger distance (i.e., a smaller number of the through-holes 225 are arranged) compared to the remaining portions. In addition, in the portion of the support member 220 corresponding to the middle region, it is preferable that the distance between the plurality of through-holes 225 gradually increases in the direction from the high temperature region toward the low temperature region (i.e., the number of the plurality of through-holes 225 gradually decreases in the direction from the high temperature region toward the low temperature region).

As such, the region where the plurality of battery cells 100 are disposed is divided into a plurality of temperature regions based on the temperature distribution of the plurality of battery cells 100, and the distance between the plurality of through-holes 225 is set differently according to the plurality of temperature regions. Therefore, heat generated in the plurality of battery cells 100 may be discharged more efficiently. In particular, since the plurality of through-holes 225 may be formed at a larger distance (in a small number) in the portion of the support member 220 corresponding to the low temperature region, the number of the plurality of through-holes 225 may be reduced as compared with a case where the plurality of through-holes 225 are formed at a predetermined distance from each other with respect to the entire region where the plurality of battery cells 100 are disposed. Therefore, the number of man-hours and time required for processing the plurality of through-holes 225 into the support member 220 and filling the plurality of through-holes 225 with the thermal interface material 400 may be reduced. In addition, as the amount of the thermal interface material 400 necessary for filling the plurality of through-holes 225 may be reduced, the cost required for using the thermal interface material 400 may be reduced.

Meanwhile, the heat sink 300 contacts the other surface of the support member 220 opposite to one surface of the support member 220 facing the plurality of battery cells 100. A cooling channel 310 is formed in the heat sink 300. A coolant for cooling the plurality of battery cells 100 may flow into the cooling channel 310. The coolant may be a cooling gas or cooling water. The heat generated in the plurality of battery cells 100 is transferred to the support member 220 and then transferred to the heat sink 300 to be absorbed by the coolant flowing in the cooling channel 310 of the heat sink 300.

According to the first embodiment of the present invention, the plurality of through-holes 225 are formed in the support member 220 adjacent to the plurality of battery cells 100 and in contact with the heat sink 300, and the plurality of through-holes 225 are filled with the thermal interface material 400. Therefore, the heat generated in the plurality of battery cells 100 may be smoothly discharged to the heat sink 300 through the thermal interface material 400 in the plurality of through-holes 225. Therefore, since the amount of the thermal interface material 400 may be reduced in the case in which there is no need to interpose a separate thermal interface material 400 between the plurality of battery cells 100 and the support member 220, or the thermal interface material 400 is interposed between the plurality of battery cells 100 and the support member 220, the weight of the battery module 10 may be reduced and the cost required for using the thermal interface material 400 may be reduced.

In addition, according to the first embodiment of the present invention, the region where the plurality of battery cells 100 are disposed is divided into the plurality of temperature regions based on the temperature distribution of the plurality of battery cells 100 and the distance between the plurality of through-holes 225 is set differently according to the plurality of temperature regions. Therefore, the heat generated from the plurality of battery cells 100 may be discharged more efficiently. In particular, the through-holes 225 may be formed by reducing the number of through-holes 225 in the portion corresponding to the low temperature region, and the number of man-hours and time required to fill the through-holes 225 with the thermal interface material 400 may be reduced.

Hereinafter, a battery module according to a second embodiment of the present invention will be described with reference to FIGS. 8 to 10. The same components as those of the first embodiment described above are denoted by the same reference numerals, and a detailed description thereof will be omitted.

Figure 8:
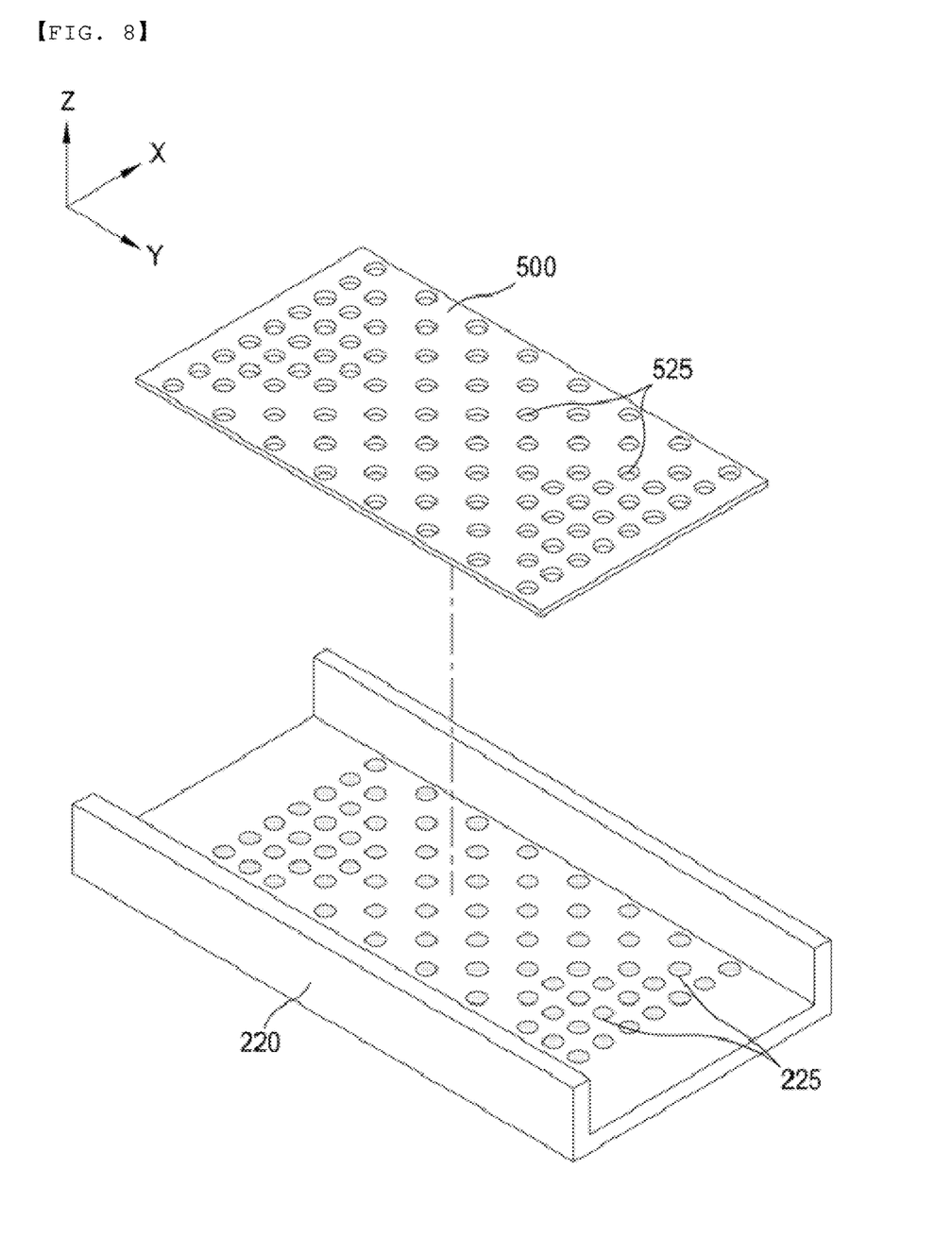
FIG. 8 is a perspective view schematically showing a heat dissipation pad and a support member of a battery module according to a second embodiment of the present invention.
Figure 9:
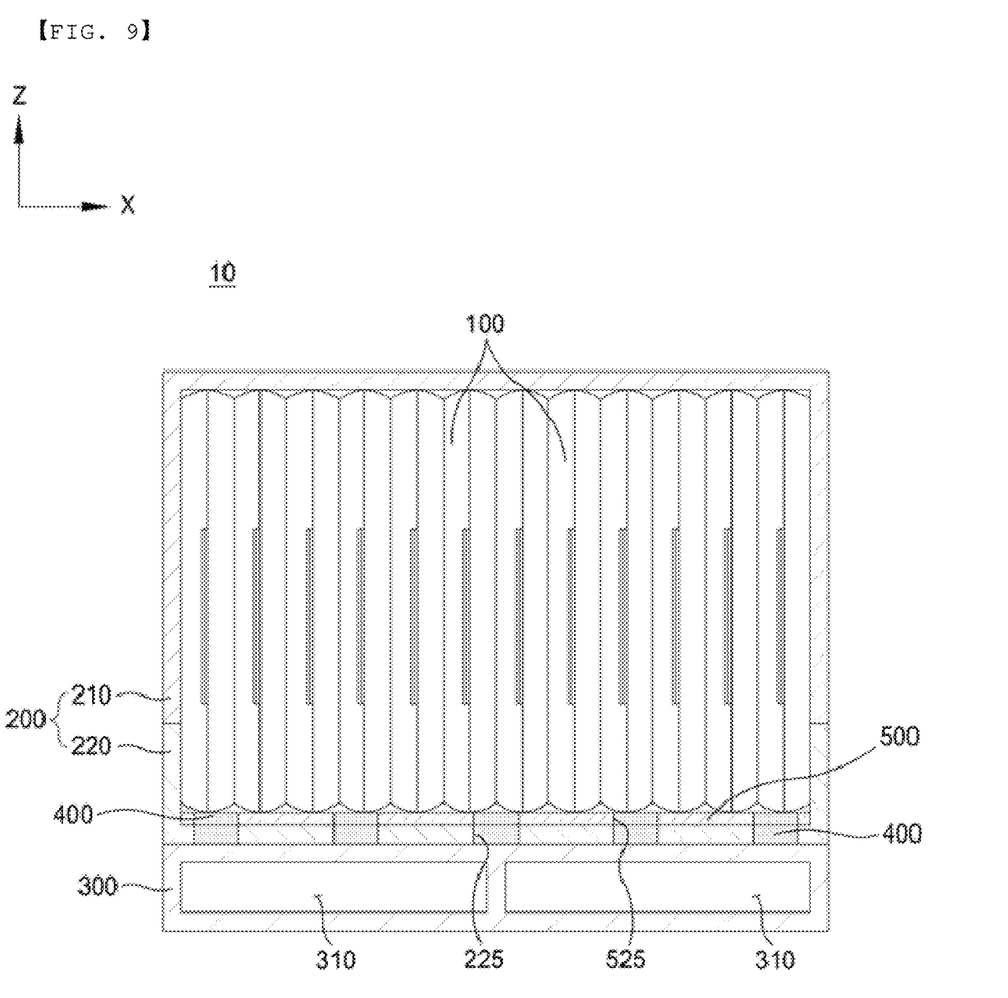
FIG. 9 is a sectional view schematically showing the battery module according to the second embodiment of the present invention.
Figure 10:
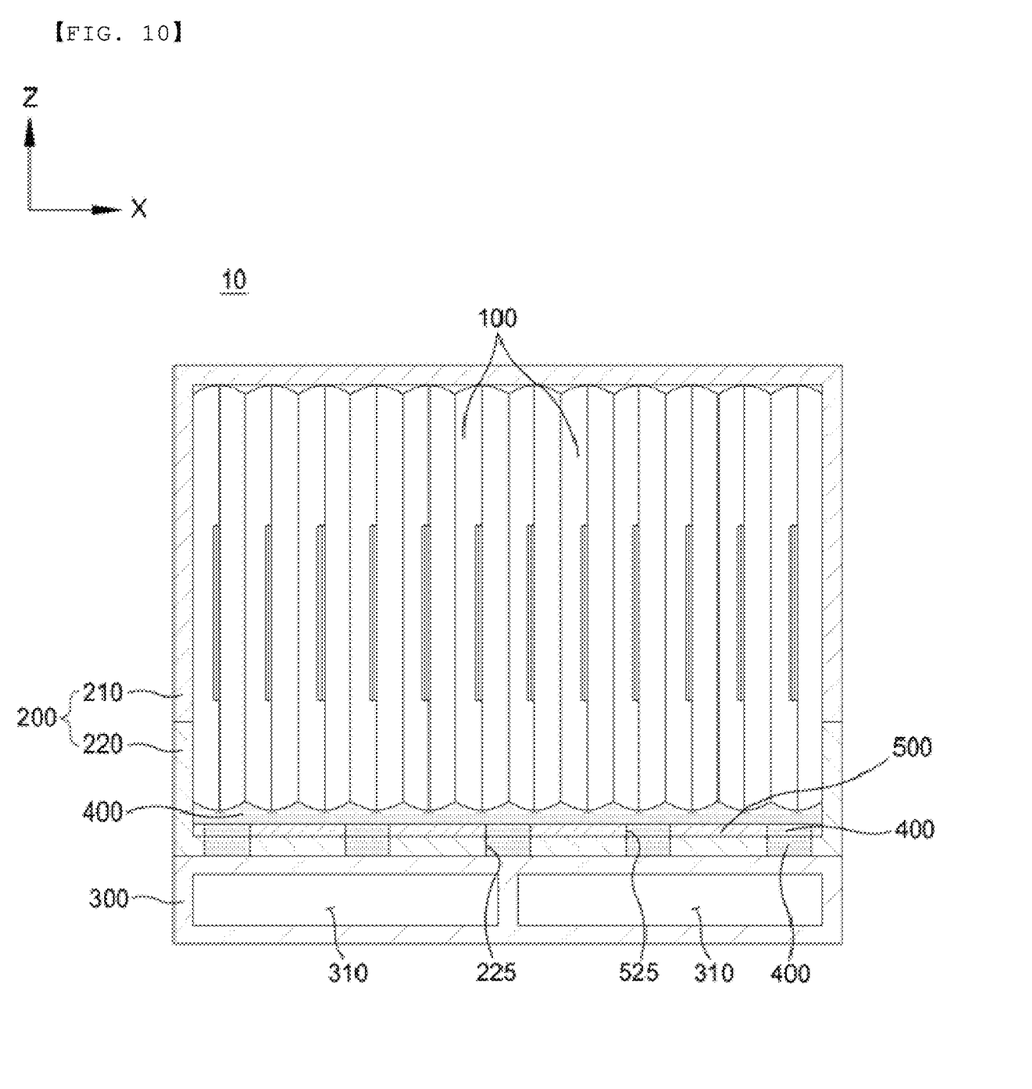
FIG. 10 is a sectional view schematically showing another example of the battery module according to the second embodiment of the present invention.

As shown in FIGS. 8 to 10, the battery module 10 according to the second embodiment of the present invention may further comprise a heat dissipation pad 500 disposed between a plurality of battery cells 100 and a support member 220.

It is preferable that the heat dissipation pad 500 is made of a material having thermal conductivity and buffering properties.

As shown in FIG. 9, the plurality of battery cells 100 may directly contact the heat dissipation pad 500. In this case, the heat generated in the plurality of battery cells 100 may be directly transferred to the heat dissipation pad 500 and then transferred to the heat sink 300 through the support member 220.

In another example, as shown in FIG. 10, a thermal interface material 400 may be interposed between the plurality of battery cells 100 and the heat dissipation pad 500. In this case, the heat generated from the plurality of battery cells 100 may be transferred to the heat dissipation pad 500 through the thermal interface material 400 and then transferred to the heat sink 300 through the support member 220.

As shown in FIG. 8, a plurality of through-holes 525 may be formed in the heat dissipation pad 500. The plurality of through-holes 525 of the heat dissipation pad 500 may be formed at positions corresponding to the plurality of through-holes 225 of the support member 220. Each of the plurality of through-holes 525 may have various shapes such as a circular shape and a polygonal shape. The inside of the plurality of through-holes 525 may be filled with the thermal interface material 400. The thermal interface material 400 may contact the plurality of battery cells 100, the support member 220, and the thermal interface material 400 in the through-holes 225 of the support member 220 through the through-holes 525. Therefore, the heat generated in the plurality of battery cells 100 may be transferred to the support member 220 through the thermal interface material 400.

Therefore, as shown in FIG. 9, even in the case in which a separate thermal interface material 400 is not interposed between the plurality of battery cells 100 and the heat dissipation pad 500, the heat generated from the plurality of battery cells 100 may be smoothly discharged to the outside through the heat dissipation pad 500, the thermal interface material 400 in the through-holes 525 of the heat dissipation pad 500, the support member 220, and the through-holes 225 of the support member 220.

In addition, as shown in FIG. 10, the thermal interface material 400 may be provided between the plurality of battery cells 100 and the heat dissipation pad 500 so as to be connected to the thermal interface material 400 in the plurality of through-holes 525 of the heat dissipation pad 500. In this case, since the heat transfer efficiency increases as the plurality of through-holes 525 of the heat dissipation pad 500 are filled with the thermal interface material 400, the amount of the thermal interface material 400 interposed between the plurality of battery cells 100 and the heat dissipation pad 500 may be reduced. Therefore, as the amount of the heat transfer material 400 is reduced, the weight of the battery module 10 may be reduced, and the cost of using the thermal interface material 400 may be reduced.

Meanwhile, in consideration of the temperature distribution of the entire region where the plurality of battery cells 100 are disposed, it is preferable that the plurality of through-holes 525 are appropriately distributed in the heat dissipation pad 500. The distance and distribution patterns of the plurality of through-holes 525 of the heat dissipation pad 500 may be similar to or the same as the distance and distribution patterns of the plurality of through-holes 225 formed in the support member 220. Accordingly, the thermal transfer material 400 in the through-hole 525 of the heat dissipation pad 500 may be connected to the thermal interface material 400 in the through-holes 225 of the support member 220, thereby the heat generated from the plurality of battery cells 100 may be smoothly discharged to the outside through the thermal interface material 400 in the through-holes 525 of the heat dissipation pad 500 and the thermal interface material 400 in the through-holes 225 of the support member 220.

Accordingly, the region where the plurality of battery cells 100 are disposed is divided into a plurality of temperature regions based on the temperature distribution of the plurality of battery cells 100, and the distance between the plurality of through-holes 525 is set differently according to the plurality of temperature regions. Therefore, heat generated in the plurality of battery cells 100 may be discharged more efficiently. In particular, since the plurality of through-holes 525 may be formed at a larger distance (in a small number) in the portion of the heat dissipation pad 500 corresponding to the low temperature region, the number of man-hours and time required for processing the plurality of through-holes 525 into the heat dissipation pad 500 and filling the plurality of through-holes 525 with the thermal interface material 400 may be reduced as compared with a case where the plurality of through-holes 525 are formed at a predetermined distance from each other with respect to the entire region where the plurality of battery cells 100 are disposed. In addition, as the amount of the thermal interface material 400 necessary for filling the plurality of through-holes 525 may be reduced, the cost required for using the thermal interface material 400 may be reduced.

According to the second embodiment of the present invention, the plurality of through-holes 525 are formed in the heat dissipation pad 500 which is provided between the plurality of battery cells 100 and the support member 220, and the plurality of through-holes 525 are filled with the thermal interface material 400. As a result, the heat generated in the plurality of battery cells 100 may be smoothly discharged to the outside through the thermal interface material 400 in the plurality of through-holes 525 of the heat dissipation pad 500 and the thermal interface material 400 in the plurality of through-holes 225 of the support member 220. Therefore, since the amount of the thermal interface material 400 may be reduced in the case in which there is no need to interpose a separate thermal interface material 400 between the plurality of battery cells 100 and the heat dissipation pad 500, or the thermal interface material 400 is interposed between the plurality of battery cells 100 and the heat dissipation pad 500, the weight of the battery module 10 may be reduced and the cost required for using the thermal interface material 400 may be reduced.

In addition, according to the second embodiment of the present invention, the region where the plurality of battery cells 100 are disposed is divided into the plurality of temperature regions based on the temperature distribution of the plurality of battery cells 100 and the distance between the plurality of through-holes 525 is set differently according to the plurality of temperature regions. Therefore, the heat generated from the plurality of battery cells 100 may be discharged more efficiently, and the number of man-hours and time required to fill the through-holes 525 with the thermal interface material 400 may be reduced by reducing the number of through-holes 525 in the portion corresponding to the low temperature region.

Although the preferred embodiments of the present invention have been described by way of illustration, the scope of the present invention is not limited to the specific embodiments described herein, and the present invention can be appropriately modified within the category described in the claims.

DESCRIPTION OF REFERENCE NUMERALS

100: Battery cell
200: Housing
300: Heat sink
400: Thermal interface material
500: Heat dissipation pad

INDUSTRIAL APPLICABILITY

According to an embodiment of the present invention, a plurality of through-holes are formed in a support member adjacent to a plurality of battery cells and in contact with a heat sink, and the plurality of through-holes are filled with a thermal interface material. As a result, heat generated in the plurality of battery cells may be smoothly discharged to the heat sink through the thermal interface material in the plurality of through-holes. Therefore, since the amount of the thermal interface material may be reduced even in the case in which there is no need to interpose a separate thermal interface material between the plurality of battery cells and the support member, or the thermal interface material is interposed between the plurality of battery cells and the support member, the weight of a battery module may be reduced and the cost required for using the thermal interface material may be reduced.

In addition, according to the embodiment of the present invention, a region where the plurality of battery cells are disposed is divided into a plurality of temperature regions based on the temperature distribution of the plurality of battery cells and the distance between the plurality of through-holes is set differently according to the plurality of temperature regions. Therefore, heat generated from the plurality of battery cells may be discharged more efficiently. In particular, the number of man-hours and time required to form the through-holes may be reduced by reducing the number of through-holes in the portion corresponding to the low temperature region.

The invention claimed is:

1. A battery module comprising:
    a plurality of battery cells stacked on each other;
    a housing accommodating the plurality of battery cells and including a support member configured to support the plurality of battery cells; and
    a heat sink configured to contact the support member,
    wherein the support member has a plurality of through-holes formed therein, and the plurality of through-holes are filled with a thermal interface material,
    wherein a region in which the plurality of battery cells are disposed is divided into a plurality of temperature regions based on a temperature distribution of the plurality of battery cells, the plurality of temperature regions including at least a high temperature region and a low temperature region,
    wherein a first ratio is defined by a total area of the through-holes in a portion of the support member corresponding to the high temperature region to a total area of the support member in the high temperature region, and a second ratio is defined by a total area of the through-holes in a portion of the support member corresponding to the low temperature region to a total area of the support member in the low temperature region, the first ratio being higher than the second ratio.

2. The battery module according to claim 1, wherein a distance between each of the plurality of through-holes formed in the support member is set differently in the high temperature region than in the low temperature region.

3. The battery module according to claim 2, wherein the distance between each of the plurality of through-holes formed in the support member is smaller in the high temperature region than in the low temperature region.

4. The battery module according to claim 3, wherein:
    the plurality of temperature regions include a middle region between the high temperature region and the low temperature region, and
    the distance between the plurality of through-holes in a portion of the support member corresponding to the middle region gradually increases along a direction from the high temperature region towards the low temperature region.

5. The battery module according to claim 1, wherein:
    the plurality of temperature regions include a middle region between the high temperature region and the low temperature region, and
    a third ratio is defined by a total area of the through-holes in a portion of the support member corresponding to the middle region to a total area of the support member in the middle region, the third ratio gradually increasing along a direction from the low temperature region towards the high temperature region.

6. The battery module according to claim 1, wherein a thermal interface material is interposed between the plurality of battery cells and the support member so as to be connected to the thermal interface material in the plurality of through-holes of the support member.

7. The battery module according to claim 6, wherein portions between the plurality of battery cells and the support member are filled with the thermal interface material, the thermal interface material being in close contact with the plurality of battery cells.

8. The battery module according to claim 1, further comprising a heat dissipation pad disposed between the plurality of battery cells and the support member,
    wherein the heat dissipation pad has a plurality of through-holes formed therein, and the plurality of through-holes of the heat dissipation pad are filled with the thermal interface material.

9. The battery module according to claim 8, wherein:
the plurality of through-holes of the heat dissipation pad are formed at positions corresponding to the plurality of through-holes of the support member, and
the thermal interface material in the plurality of through-holes of the heat dissipation pad and the thermal interface material in the plurality of through-holes of the support member are connected to each other.

10. The battery module according to claim 8, wherein a distance between each of the plurality of through-holes formed in the heat dissipation pad is set differently in the high temperature region than in the low temperature region.

11. The battery module according to claim 10, wherein the distance between each of the plurality of through-holes formed in the heat dissipation pad is smaller in the high temperature region than in the low temperature region.

12. The battery module according to claim 11, wherein:
the plurality of temperature regions include a middle region between the high temperature region and the low temperature region, and
the distance between the plurality of through-holes in a portion of the heat dissipation pad corresponding to the middle region gradually increases along a direction from the high temperature region towards the low temperature region.

13. The battery module according to claim 8, wherein:
the plurality of temperature regions include a middle region between the high temperature region and the low temperature region, and
a third ratio is defined by a total area of the through-holes in a portion of the heat dissipation pad corresponding to the middle region to a total area of the heat dissipation pad in the middle region, the third ratio gradually increasing along a direction from the low temperature region towards the high temperature region.

14. The battery module according to claim 8, wherein a thermal interface material is interposed between the plurality of battery cells and the heat dissipation pad so as to be connected to the thermal interface material in the plurality of through-holes of the heat dissipation pad.

15. The battery module according to claim 14, wherein portions between the plurality of battery cells and the heat dissipation pad are filled with the thermal interface material, the thermal interface material being in close contact with the plurality of battery cells.

16. The battery module according to claim 1, wherein the heat sink includes a cooling channel defined therein for allowing a coolant to flow therethrough.

17. A battery pack comprising the battery module according to claim 1.

* * * * *